(12) United States Patent
Gray

(10) Patent No.: US 7,778,735 B2
(45) Date of Patent: Aug. 17, 2010

(54) ENVIRONMENTAL CONTROL SYSTEM, METHOD, AND COMPUTER PROGRAM PRODUCT FOR CONTROLLING THE INTERIOR ENVIRONMENT OF A PRESSURIZED COMPARTMENT

(75) Inventor: John C. Gray, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 841 days.

(21) Appl. No.: 11/561,161

(22) Filed: Nov. 17, 2006

(65) Prior Publication Data

US 2008/0115837 A1 May 22, 2008

(51) Int. Cl.
*G06F 19/00* (2006.01)
(52) U.S. Cl. .................... 700/276; 244/118.5
(58) Field of Classification Search ........... 700/276, 700/282; 244/118.5, 118.4, 199; 454/71, 454/72; 296/1.46
See application file for complete search history.

(56) References Cited

U.S. PATENT DOCUMENTS

| | | | | |
|---|---|---|---|---|
| 5,137,230 A | * | 8/1992 | Coffinberry | 244/118.5 |
| 5,316,560 A | * | 5/1994 | Krone-Schmidt et al. | 55/385.2 |
| 5,934,614 A | | 8/1999 | Mueller et al. | |
| 5,967,461 A | * | 10/1999 | Farrington | 244/118.5 |
| 6,159,091 A | | 12/2000 | Horstman et al. | |
| 6,491,254 B1 | * | 12/2002 | Walkinshaw et al. | 244/118.5 |
| 6,641,008 B2 | * | 11/2003 | Falzone et al. | 224/157 |
| 6,681,592 B1 | | 1/2004 | Lents et al. | |
| 7,207,392 B2 | * | 4/2007 | Kotliar | 169/45 |
| 2005/0151016 A1 | | 7/2005 | Kelnhofer et al. | |
| 2006/0211359 A1 | * | 9/2006 | Arthurs et al. | 454/74 |
| 2006/0219842 A1 | * | 10/2006 | Shell et al. | 244/118.5 |
| 2007/0138830 A1 | * | 6/2007 | Isaac | 296/146.16 |

FOREIGN PATENT DOCUMENTS

| GB | 628354 A | 8/1949 |
|---|---|---|
| JP | 2000203496 A | 7/2000 |

\* cited by examiner

*Primary Examiner*—Kidest Bahta
(74) *Attorney, Agent, or Firm*—Alston & Bird LLP

(57) ABSTRACT

Methods, environmental control systems, and computer program products are provided for controlling an internal environment of a pressurized compartment of a vehicle. In one aspect, the pressurized compartment includes first and second exit valves for selectively allowing gas to exit the pressurized compartment. The first and second exit valves are located, respectively, in spaced apart portions of the pressurized compartment. The pressurized compartment also includes first and second systems that are located, respectively, in the spaced apart portions of the pressurized compartment. Flow rates of gases in the first and second systems are determined and at least one of the first and second exit valves is controlled in response to the flow rate determinations.

23 Claims, 3 Drawing Sheets

ENVIRONMENTAL CONTROL SYSTEM, METHOD, AND COMPUTER PROGRAM PRODUCT FOR CONTROLLING THE INTERIOR ENVIRONMENT OF A PRESSURIZED COMPARTMENT

FIELD OF THE INVENTION

Embodiments of the present invention are related to environmental control systems, methods, and computer program product for controlling the internal environment of a pressurized compartment, and in particular to environmental control systems, methods, and computer program product for controlling the internal environment of a pressurized compartment of an airplane that includes subsystems having flow rates that vary over time.

BACKGROUND OF THE INVENTION

Airplanes flying at altitude operate in reduced pressure portions of the atmosphere. For this reason, most commercial airplanes employ a circulation system that maintains at least a minimum pressure in the cabin for passenger comfort. This cabin pressure must be maintained while continuing to allow air to be exchanged between the cabin and the outside environment, thereby assuring a sufficient level of fresh air and oxygen for passengers. In all, the air circulation system of an airplane must assure both a proper air flow rate and a proper pressure in the cabin. To do so, at least some airplanes include an air inflow valve through which air can be introduced at a specified rate and a forward and rear adjustable exit valves.

Aside from the above requirements, typical airplanes are equipped with multiple environmental control systems that serve to condition the air circulated through the plane. These systems include temperature control systems, cabin air distribution systems, electronic equipment cooling systems, cargo heat and air conditioning systems, lavatory and galley exhaust systems, nitrogen generation systems, and moisture control systems, amongst others. In some cases, the environmental control systems negatively affect the air passing through those systems. For example, some systems add undesirable amounts of thermal energy to the air; other systems release particles into the air that cause unwanted odors. It is desirable that any such affected air remain separated from the passenger areas of the plane, and a typical strategy for accomplishing this objective is to cause inflow of air into the cabin to be equal to the flow rate of air through the environmental control systems. Forward and rear exit valves are configured to open and close in proportion to one another such that the proportion of air exiting the respective valves is similar to the proportion of air flowing in systems located, respectively, in the forward and rear portions of the plane. A typical distribution of valve and system flow rates is 25% in the front and 75% in the rear (at steady state). Thus, the rear exit valve is typically opened so as to permit three times the flow rate permitted by the forward exit valve. In this way, the inflow of air serves to entrain the affected air from the environmental control systems and causes that air to be expelled from the cabin via the exit valves before it is re-circulated in the cabin and reaches the passengers.

In more recent times, airplanes have incorporated some environmental control systems that vary temporally in the amount of air they utilize and affect. This configuration is generally shown in FIGS. 1a and 1b, in which a pressurized compartment 10 includes an inflow valve 12, forward and rear exit valves 14a-b, and forward and rear environmental control systems 16a-b. As shown in the figures, forward system 16a varies between a "Mode 1" state, in which the system has a steady state flow capacity of 500 cubic feet per minute (cfm) and a "Mode 2" state, in which the system has a flow capacity of 1500 cfm. At the same time, the rear system 16b maintains a constant flow capacity of 1500 cfm. As such, the total flow of air into and out of the pressurized compartment is 2000 cfm when the forward system is in Mode 1 and 3000 cfm when the forward system is in Mode 2.

As shown, air enters the pressurized compartment from the inflow valve 12 in amount equal to the aggregate capacity of the forward and rear systems 16a-b. Because the air flow requirements vary over time, the capacity of the inflow valve and exit valves must be varied correspondingly. However, in most conventional aircraft, the forward and rear valves vary together, such that the proportion of air flowing through each one is constant. In FIGS. 1a and 1b, the proportion of the flow exiting the forward exit valve is 25%, 75% going through the rear exit valve (a typical distribution, as discussed earlier). When the forward system is in Mode 1, this proportion matches the proportion of flows through the forward and rear systems. In that case, the air flowing through the forward system exits from the forward exit valve, and the same is true for the rear system and exit valve. However, when the forward system is in Mode 2, the proportion of flows through the forward and rear systems does not match that of the forward and rear exit valves. In that case, some of the air flowing through the forward system is "re-circulated" through the pressurized compartment until it ultimately exits at the rear exit valve. This can be disadvantageous in that the re-circulated air may be malodorous or excessively hot, and during the re-circulation, such air may pass through the cabin and come in contact with occupants of the cabin. This strategy of adjusting the forward and rear exit valves in a set proportion is therefore ineffective for expelling affected air before it reaches passengers. A new strategy is therefore desired, in which passengers are isolated from negatively impacted portions of the internal environment even as the operation of systems that varies with time.

SUMMARY OF THE INVENTION

Embodiments of the invention may address at least some of the above disadvantages and achieve still other advantages by providing an environmental control system, a method, a computer program product, and an air vehicle that control the interior environment of a pressurized compartment. In this regard, exit valves of the pressurized compartment may be controlled based at least in part upon the flow rates of gases in various onboard systems so as to readily accommodate changes in the operation of the onboard systems, thereby reducing, if not altogether avoiding, unintended re-circulation of air within the pressurized compartment.

In one embodiment, an environmental control system for a pressurized compartment is provided. The environmental control system includes at least first and second adjustable exit valves for selectively allowing gas to exit the pressurized compartment. The first and second exit valves may be located, respectively, in first and second portions of the pressurized compartment. The environmental control also includes a controller for determining flow rates of gases in at least first and second systems that are located, respectively, in the first and second portions of the pressurized compartment. The controller may be configured to control at least one of said first and second exit valves at least partly in response to flow rate determinations of gases in at least the first and second systems. The controller may be configured to control the first and second exit valves to maintain a predetermined pressure inside the pressurized compartment and to avoid movement of gases from the first and second systems to, respectively, the second and first exit valves. Controller may also include sensors configured to measure flow rates in the first and second systems.

The environmental control system may also include at least one pressure sensor in communication with the controller. In such cases, the controller may be configured to control at least one of the first and second exit valves at least partly in response to measurements of the pressure sensor. In one embodiment, the pressure sensor is configured to measure at least one of a pressure inside the pressurized compartment or a pressure outside the pressurized compartment. In another embodiment, the pressure sensor is configured to measure a difference between a pressure inside the pressurized compartment and a pressure outside the pressurized compartment.

Another embodiment is directed to a method for controlling an internal environment of a pressurized compartment of a vehicle. The pressurized compartment includes at least first and second adjustable exit valves for selectively allowing gas to exit the pressurized compartment, the first and second exit valves being located, respectively, in spaced apart portions of the pressurized compartment. The pressurized compartment also includes at least first and second systems that are located, respectively, in the spaced apart portions of the pressurized compartment. Flow rates of gases in the first and second systems are determined, and at least one of the first and second exit valves are controlled at least partially in response to determining the flow rates of gases in the first and second systems.

Yet another embodiment is directed to a computer program product for facilitating the control of an internal environment of a pressurized compartment of a vehicle, the computer program product comprising a computer-readable storage medium having computer-readable program code portions stored therein. The computer-readable program code portions include a first executable code portion for determining at least first and second flow rates of gases in at least first and second systems located in spaced apart portions of the pressurized compartment. Also included is a second executable code portion for controlling at least one of first and second exit valves respectively located in the spaced apart portions of the pressurized compartment at least partially in response to determining the flow rates of gases in the first and second systems

BRIEF DESCRIPTION OF THE DRAWINGS

Figure 1A:
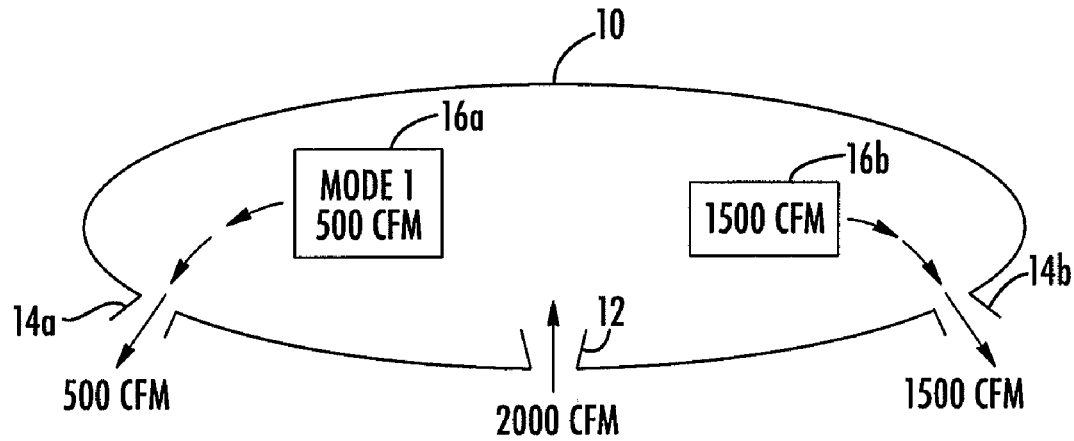
Figure 1B:
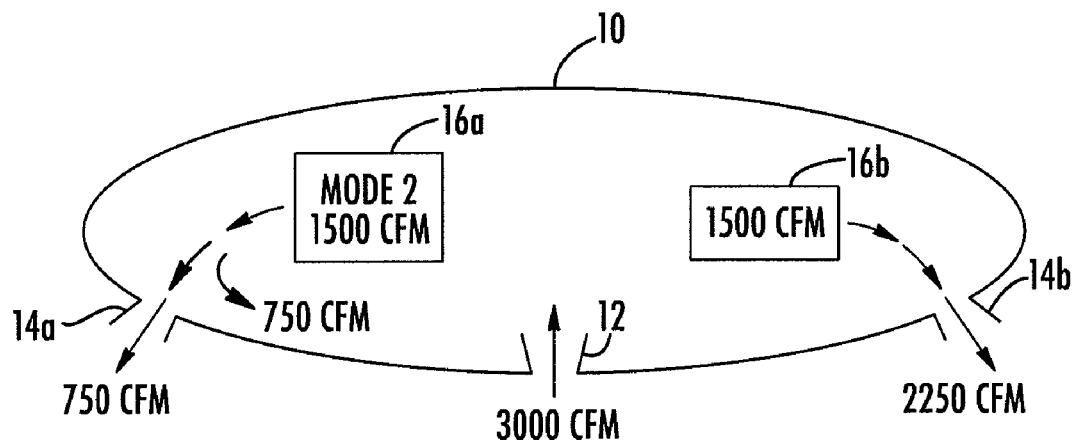
Figure 5:
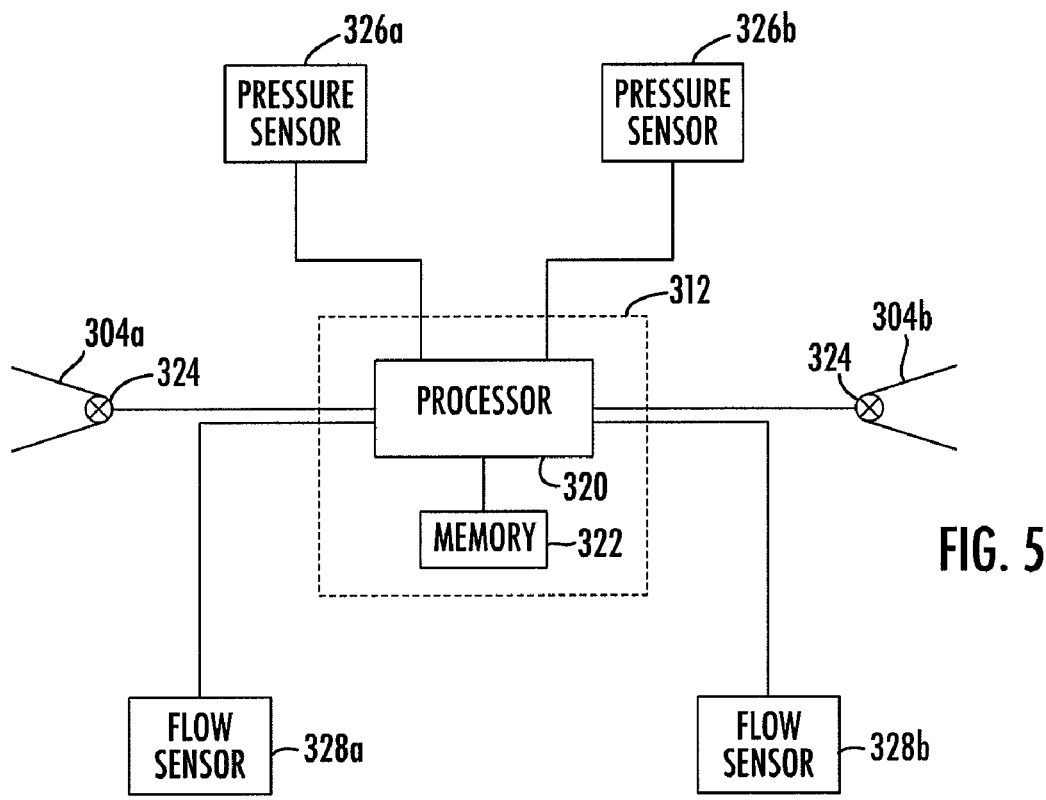
Figure 2:
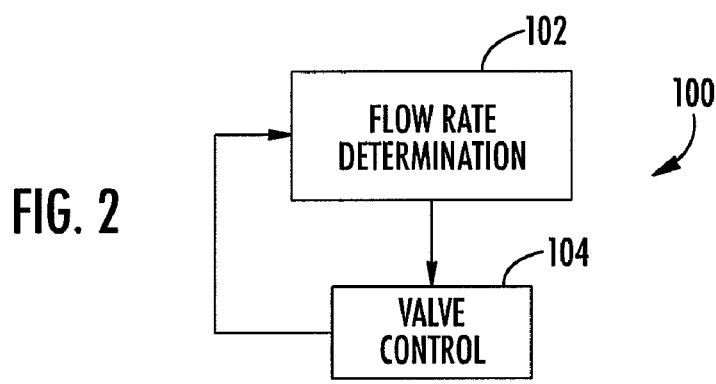
Figure 3:
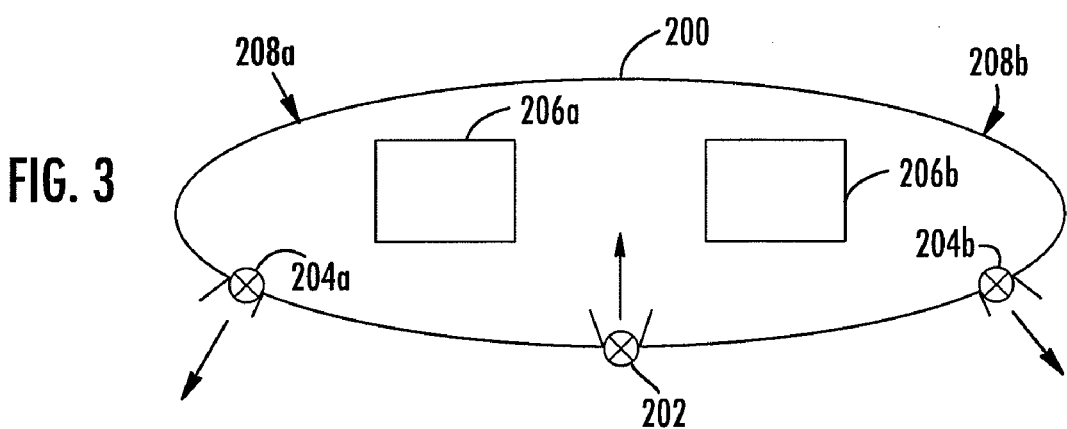
Figure 4:
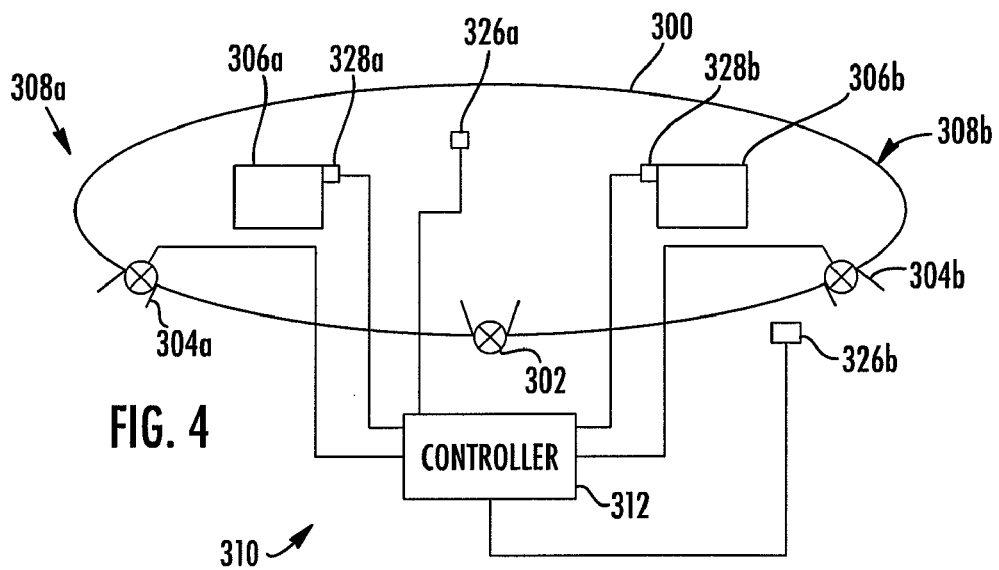
Figure 6A:
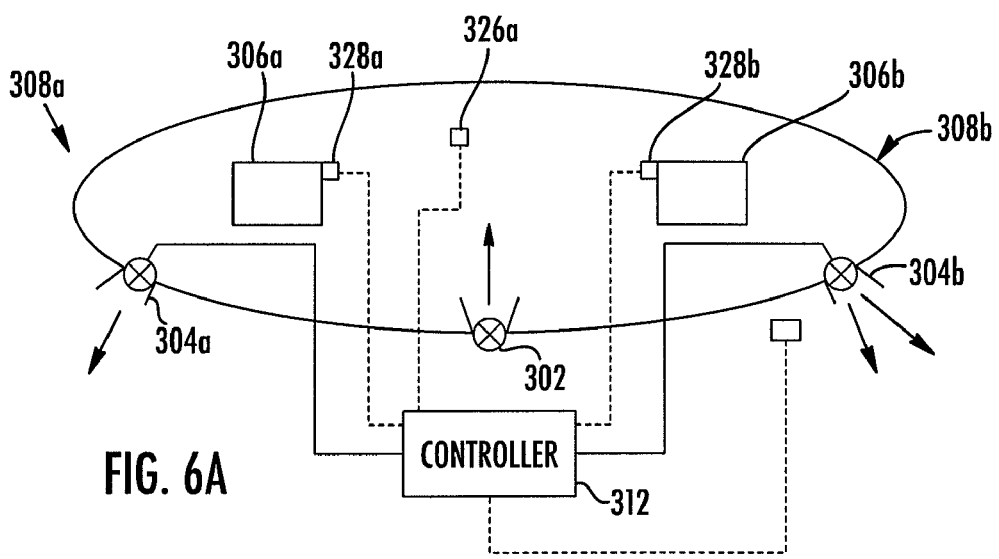
Figure 6B:
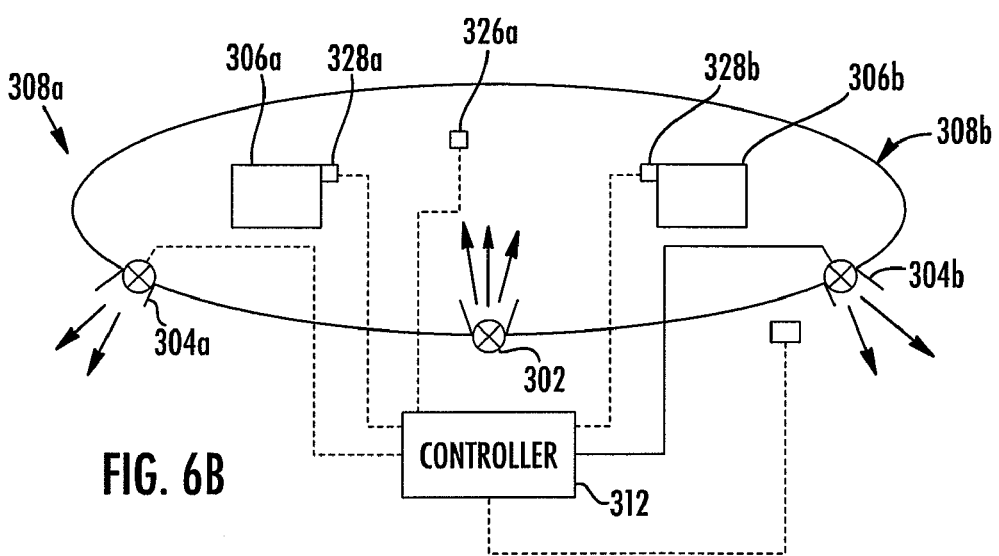

Having thus described the invention in general terms, reference will now be made to the accompanying drawings, which are not necessarily drawn to scale, and wherein:

FIGS. 1a and 1b are schematic illustrations of a conventional control system for a commercial airplane;

FIG. 2 is a flow chart representing a method for controlling an internal environment of a pressurized compartment, the method being in accordance with an embodiment of the present invention;

FIG. 3 is a schematic representation of a pressurized compartment in which the method of FIG. 2 might operate;

FIG. 4 is a representation of a fuselage of an air vehicle including an internal environment control system configured in accordance with an embodiment of the present invention;

FIG. 5 is a schematic representation of the environmental control system of FIG. 4, showing the controller to include a processor and memory included in the controller; and FIGS. 6a and 6b provide exemplary illustrations of the functioning of the environmental control system of FIGS. 4 and 5.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 2, therein is shown a flow chart representing a method 100 for controlling an internal environment of a pressurized compartment, such as an airplane fuselage, the method being in accordance with an embodiment of the present invention. Method 100 generally allows for balancing or redistribution of the flow of gases in a pressurized compartment 200 that, as shown in FIG. 3, includes at least an inflow valve 202, first and second exit valves 204a-b, and first and second systems 206a-b that impact the environment of the compartment 200 in ways that vary with time. The respective exit valves 204a-b are located in spaced apart portions 208a-b of the compartment 200, and the respective systems 206a-b are located in similar spaced apart portions 208a-b. The systems could be, for example, mechanical, chemical, electrical, or thermal systems that operate and produce environmental impact via odors, heat, contaminants, etc. Alternatively, "systems" can refer simply to two separate portions of the pressurized compartment for which the environmental conditions change over time. For example, one "system" could be a holding area in a pressurized compartment for holding live animals, for which the impact on the environment might vary over time. In one embodiment, the pressurized compartment could be an airplane fuselage, and the first and second systems could be a forward and an aft portion of the fuselage for which the environmental conditions change, say, as a function of occupant activity (e.g., eating meals, sleeping).

Referring to FIGS. 2 and 3, method 100 begins at step 102 with a determination of the respective flow rates of gases in the first and second systems 206a-b. Determining flow rates in the systems 206a-b provides a general estimate of the volume of gas inside the compartment 200 that is impacted by systems 206a-b. At step 104, one or both of the exit valves 204a-b are controlled in response to the determination of the respective flow rates of gases in the first and second systems 206a-b. The exit valves 204a-b may also be controlled in response to other factors in addition to the flow rates in systems 206a-b without deviating from the scope of the present invention, as explained in more detail below. Finally, the process is repeated (possibly continuously, at a reasonable repeating frequency), with a new determination of flow rates and a new adjustment of the valves in order to take into account variations in the flow rates that occur over time.

It should be noted that, while the method is described above as pertaining to a pressurized compartment with two systems 206a-b, these systems may represent multiple subsystems. As such, the behavior of the subsystems is appropriately aggregated into what is otherwise described as system behavior. For example, one system, A, may include three subsystems, each with a gas flow rate of x. In some cases, the subsystems may be arranged serially, such that the total flow rate of system A is also x. However, in other cases, the subsystems may be arranged in parallel, such that the total flow rate of system A is also three times x. In general, each system may represent a range of subsystems, and the flow rate for a system is the appropriate aggregation of flow rates in the subsystems represented by that system.

Several methods are available for determining the flow rate of gases in the first and second systems 206a-b. As a first example, the flow rates can be measured directly with flow sensors placed in or near the systems 206a-b, thereby allowing for continuous monitoring. As a second example, flow rate determination can be based on the current functions and known properties of first and second systems 206a-b. This latter method is suited for cases in which the systems 206a-b vary between discrete operational states. For example, in some embodiments the first and second systems vary between two defined functions or operational states. For each operational state of a system, the system has a uniquely characterized capacity of gas that flows therefrom in a given time. Flow rate is determined based on knowledge of the operational state of the pertinent system and the characteristic flow rate of that system in that operational state. It should be noted that flow rate determinations can account for factors in addition to the measured flow rates, such as predetermined leakage standards as a function of the type and age of the pressurized compartment.

The above method 100 allows for adjustment of the gaseous input to and output from the pressurized compartment 200 in response to changing flow conditions inside the compartment 200. This method can be used to affect a variety of results in terms of the flow patterns inside the pressurized compartment. For example, in one embodiment, a flow proportion is calculated subsequent to the determination of the flow rates in each of the systems 206a-b. This flow proportion is the ratio of the flow rates through the first system 206a and second system 206b. The exit valves 204a-b are then controlled to cause the proportion of gas escaping from the first and second exit valves 204a-b to be equal to the calculated flow proportion. As a result, most, if not all, of the gases that flow through and are affected by the first system 206a (e.g., having increased temperature or carrying odor-causing particles) are entrained by the flow and caused to exit the compartment 200 at the first exit valve 204a, thereby substantially avoiding recirculation of this affected gas within the compartment 200. Similarly, recirculation of gases flowing through and affected by the second system 206b is avoided by causing gases flowing therein to escape through second exit valve 204b.

When the compartment 200 is, for example, an airplane fuselage containing occupants, a potential advantage of the above specific flow pattern is the resultant isolation of the occupants of the fuselage from negatively affected portions of the internal environment of the fuselage. By designating the spaced apart portions 208a-b as the forward and rear portions of the fuselage and correspondingly placing the systems 206a-b and valves 204a-b at the forward and rear portions 208a-b, a significant area of unaffected environment is left available for holding occupants.

Continuing to examine the example where pressurized compartment 200 is a fuselage, generally, the inflow valve 202 and exit valves 204a-b are controlled so as to assure a flow rate within the fuselage 200 sufficient both to entrain the gases flowing from the first and second systems 206a-b and to satisfy occupant breathable air requirements. Often, this latter flow requirement stems from a predetermined function based on both the number of occupants in the fuselage and typical breathing conditions. In some embodiments, one or more of the exit valves 204a-b (and perhaps the inflow 202) are also controlled in response to the pressure inside and/or outside the fuselage 200 or differences in internal and external pressure. For example, in one embodiment, the first and second valves 204a-b are controlled in response to a combination of the flow rate determinations for the first and second systems 206a-b (which determinations may be a function of one or more pressure measurements inside the pressurized compartment), pressure differences across the valves (either measured directly as a differential or by separately measuring the internal and external pressure and taking a difference), and flow characteristics, in some cases previously measured, for the valves 204a-b. In another embodiment, the first valve 204a can be controlled in response to flow rate determinations for the first and second systems 206a-b, and the second valve 204b can be controlled so as to modulate the pressure in the fuselage 200. In this way, proper pressure conditions for both occupants and the airplane systems are maintained. In other embodiments, other factors affect flow rate control, such as the flow rate of gases into the pressurized compartment/fuselage from the inflow valve and the rate of gas leakage from the pressurized compartment.

Another advantage possibly offered by embodiments in which the pressurized compartment is an airplane fuselage and the first and second exit valves are located at the fore and aft of the fuselage, respectively, is the potential for minimizing, for a given internal condition, the volume of gas exiting the fore exit valve. By adjusting the fore and aft exit valves to modify the proportion of flows through the two, just enough gas can be allowed to exit the fore exit valve to satisfy entrainment and/or breathing requirements. Remaining outflow is accommodated by the aft exit valve, and the flow through the aft exit valve is therefore maximized for a given internal condition of the fuselage. Because gases exiting the aft exit valve aid in propelling the airplane, this configuration therefore allows for "thrust recovery" or increased thrust due to the operation of non-propulsion systems.

Referring to FIG. 4, therein is shown a pressurized compartment in the form of an airplane fuselage 300, the fuselage 300 including an internal environment control system 310 configured in accordance with an embodiment of the present invention. The fuselage 300 includes forward and rear subsystems 306a-b for handling a variety of tasks and affecting the air flowing through the fuselage. The subsystems 306a-b are located, respectively, at forward and rear portions 308a-b of the fuselage 300 and the flow rates provided by the subsystems 306a-b vary over time, perhaps as the function or utilization of the subsystems vary.

An adjustable inflow valve 302 allows fresh air to be forced into the fuselage 300. Some of the air in the fuselage 300 flows through the forward and rear subsystems 306a-b before ultimately escaping the fuselage 300 via adjustable forward and rear exit valves 304a-b, also located, respectively, in the forward and rear portions 308a-b of the fuselage 300. Some portion of the air may also escape the fuselage via leakage (i.e., outflow of gas in uncontrolled and, often, unintended ways, such as through imperfect seals around apertures such as doors).

Referring to FIGS. 4 and 5, a controller 312 determines the flow rates in the forward and rear subsystems 306a-b. In one embodiment, the controller 312 includes a processor 320 that receives signals indicative of the flow rates in the forward and rear subsystems 306a-b from flow sensors 328a-b, respectively. Flow sensors 328a-b may be respectively located within forward and rear subsystems 306a-b, or may be in close proximity to those subsystems. The processor 320 can be any computing device, such as a microprocessor or discrete circuitry having such capability. The processor 320 may be connected in communication with a memory 322 that stores instructions executable on the processor (i.e., software)

that govern the processor 320 in its receipt and processing of the signals from the flow sensors 328a-b. The memory 322 may also store data, for example, in tabular form, which indicates the flow rate for each system, perhaps as a function of time. In some embodiments, the data stored by the memory also include predetermined leakage values for the fuselage as a function of fuselage type and age. In another embodiment, the controller 312 may receive indications of operational states of subsystems 306a-b, and determine therefrom the flow rates in the forward and rear subsystems 306a-b.

The controller 312 is also configured for controlling the adjustable exit valves 304a-b in response to the determinations flow rates in the forward and rear subsystems 306a-b. The processor 320 is in communication with exit valves 304a-b, which may include actuators 324. The processor 320, possibly executing software stored in the memory, may use the flow rate determination for the subsystems 306a-b to actuate the valves 304a-b in the desired manner and comprehend the positions of the valves. In some cases, the processor determines the valve positions necessary to induce an exit flow from the forward valve 304a sufficient to entrain gases flowing in/from the forward subsystem 306a, and/or an exit flow from the rear valve 304b sufficient to entrain gases flowing in/from the read subsystem 306b. In other cases, the actuation of the exit valves 304a-b may also depend on, for example, the difference in pressure internal and external to the fuselage, as measured by pressure sensors 326a-b, respectively (or as measured by a single sensor configured to sense pressure differences directly), and/or on the leakage rate of the fuselage. The processor 320 may obtain from memory 322 flow characterizations of the exit valves 304a-b, such that determination of the pressure difference across the valves and valve position allows calculation of the flow rate through the valves. Subsequent to performing the instructed calculations, the processor 320 sends a signal actuating the valves 304a-b. Once the valves 304a-b have been actuated, controller 312 may examine the flow rates through the exit valves 304a-b and through the systems 306a-b to determine if further adjustments to the valves 304a-b are required in order to yield the desired flow patterns. Such updating of the valve positions can happen continuously throughout operation of the controller 312.

In some cases, the controller 312 may seek to adjust the exit valves to produce a certain flow condition, but may be incapable of achieving the desired flow condition in light of the existing rate of gas flow into the fuselage due, for example, to fuselage leakage. In such cases, controller 312 may be configured to cease functioning as above, for example, by being overridden by a different system of the fuselage or by operating in another mode.

An exemplary illustration of the functioning of the control system 310 of FIGS. 4 and 5 is presented in FIGS. 6a and 6b. Generally, air flows into the fuselage 300 through the inflow valve 302 and through subsystems 306a-b. As air flows through subsystems 306a-b, that air is negatively impacted through, for example, heating of the air or the introduction into the air of odor-causing particles. The controller 312 determines the rate of air flowing through each of the subsystems 306a-b, this providing an estimate of the volume of air negatively affected by the subsystems 306a-b. The controller 312 makes this determination either by obtaining information regarding the operational states subsystem 306a-b and automatically correlating this information to flow rates, or by measuring flow rates directly.

In FIG. 6a, a first state is experienced in which twice as much air flows through the rear subsystem 306b as through the forward subsystem 306a. Exit valves 304a-b are therefore controlled to allow twice as much air to escape through the rear exit valve 304b as through the forward exit valve 304a. As such, virtually all of the air flowing through the forward subsystem exits from the forward exit valve, and virtually all of the air flowing through the rear subsystem exits from the rear exit valve. In FIG. 6b, the system has moved to a new state, possibly due to a change in the operation of the forward subsystem 306a, in which the flow through the forward and rear subsystems 306a-b are roughly equal. At that point, controller 312 receives indication of the changed flow conditions in the forward subsystem 306a and sends a signal to the forward exit valve 304a, causing that valve to actuate such that more air flows through the forward exit valve 304a. Once the system has reached steady state, the system again has the property that virtually all of the air flowing through the forward subsystem 306a exits from the forward exit valve 304a, and virtually all of the air flowing through the rear subsystem 306b exits from the rear exit valve 304b. In all, the controller controls the forward and rear exit valves to maintain a predetermined pressure inside the fuselage and to avoid movement of gases from the forward subsystems to the rear exit valve, and vice versa. Control system 310 may also be configured to sense pollutants in the pressurized compartment that are not related to the subsystems (for example, a passenger spilling a bottle of perfume) or indirect indications thereof, such as increased use of fans in one area or another. Further sensors would be present in the passenger area of the fuselage, and the controller would receive indications from these sensors and cause actuation of the exit valves to allow a greater flow of fresh air through the fuselage, thereby expelling the pollutant.

FIG. 2 is a flowchart of a system, method and program product according to exemplary embodiments of the invention. It will be understood that the processes described above as being carried out by the controller, and represented generally in FIGS. 2 and 6a-b, can be implemented by various means, such as hardware, firmware, and/or software including one or more computer program instructions. In this regard, the computer program instructions which embody the procedures described above may be stored by a memory device of a computing device, such as the control server or the portals, and executed by a built-in processor of the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the above description and represented in FIGS. 2 and 6a-b. These computer program instructions may also be stored in a computer-readable memory that can direct a computer or other programmable apparatus to function in a particular manner, such that the instructions stored in the computer-readable memory produce an article of manufacture including instruction means which implement the function specified in the above description and represented in FIGS. 2 and 6a-b. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the above description and represented in FIGS. 2 and 6a-b.

Accordingly, the controller processes in the above description and represented in FIGS. 2 and 6a-b support combinations of means for performing the specified functions, combinations of steps for performing the specified functions and program instruction means for performing the specified functions. It will also be understood that one or more of the above-described controller processes, and combinations of the controller processes, can be implemented by special purpose hardware-based computer systems which perform the specified functions or steps, or combinations of special purpose hardware and computer instructions.

Many of the above descriptions employ an airplane fuselage as an example of a pressurized compartment. However, various other examples of pressurized compartments exist. For example, a pressurized compartment may be associated with a mobile platform, as in the case of aerospace vehicles and sea vehicles such as submarines. Pressurized compartments may also be associated with non-mobile platforms, such as in pressure-sensitive industrial processing applications and semiconductor fabrication facilities (i.e., "cleanrooms").

Many modifications and other embodiments of the invention will come to mind to one skilled in the art to which this invention pertains having the benefit of the teachings presented in the foregoing descriptions and the associated drawings. For example, in some embodiments, the controller may control only one exit valve, the other exit valve being separately controlled by another system. In other embodiments, the controller may or may not control the inflow valve, and/or that valve may be controlled by other systems, with the air passing into the fuselage via that valve being just one factor that the controller uses to calculate valve positions. In yet other embodiments, the controller receives a manual indication of the operational states of the subsystems of the airplane, or allows for manual input of the flow rates associated with the subsystem operational state. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An environmental control system for controlling the environment in a pressurized compartment, said environmental control system comprising:
    at least first and second adjustable exit valves for selectively allowing gas to exit the pressurized compartment, said first and second exit valves being located, respectively, in first and second portions of the pressurized compartment; and
    a controller for determining flow rates of gases in at least first and second systems that are located, respectively, in the first and second portions of the pressurized compartment, wherein the flow rates in the first and second systems are variable, said controller also being configured to control at least one of said first and second exit valves at least partly in response to flow rate determinations of gases in at least the first and second systems such that a quantity of gas exiting the pressurized compartment through the first and second exit valves has a direct relationship to the flow rates of the first and second systems, respectively.

2. An environmental control system according to claim 1, wherein said controller includes sensors configured to measure flow rates in the first and second systems.

3. An environmental control system according to claim 1, wherein said controller is configured to control said first and second exit valves to maintain a predetermined pressure inside the pressurized compartment and to avoid movement of gases from said first and second systems to, respectively, said second and first exit valves.

4. An environmental control system according to claim 1, further comprising at least one pressure sensor in communication with said controller, and wherein said controller is further configured to control at least one of said first and second exit valves at least partly in response to measurements of said pressure sensor.

5. An environmental control system according to claim 4, wherein said pressure sensor is configured to measure at least one of a pressure inside the pressurized compartment or a pressure outside the pressurized compartment.

6. An environmental control system according to claim 4, wherein said pressure sensor is configured to measure a difference between a pressure inside the pressurized compartment and a pressure outside the pressurized compartment.

7. A method for controlling an internal environment of a pressurized compartment of a vehicle, the pressurized compartment including at least first and second adjustable exit valves for selectively allowing gas to exit the pressurized compartment, the first and second exit valves being located, respectively, in spaced apart portions of the pressurized compartment, and the pressurized compartment also including at least first and second systems that are located, respectively, in the spaced apart portions of the pressurized compartment, said method comprising:
    determining flow rates of gases in the first and second systems, wherein the flow rates in the first and second systems are variable; and
    controlling at least one of the first and second exit valves at least partially in response to determining the flow rates of gases in the first and second systems such that a quantity of gas exiting the pressurized compartment through the first and second exit valves has a direct relationship to the flow rates of the first and second systems, respectively.

8. A method according to claim 7, wherein controlling at least one of the first and second exit valves includes controlling the first valve in response to determining the flow rates of gases in the first and second systems, and further comprising controlling the second valve to modulate pressure in the pressurized compartment.

9. A method according to claim 7, wherein controlling at least one of the first and second exit valves at least partially in response to determining the flow rates of gases in the first and second systems includes controlling said first and second exit valves to maintain a pressure inside the pressurized compartment that is one of greater than or equal to a predetermined pressure and to avoid movement of gases from said first and second systems to, respectively, said second and first exit valves.

10. A method according to claim 7, further comprising determining a difference in pressure between an inside of the pressurized compartment and an outside of the pressurized compartment and controlling at least one of the first and second exit valves at least partially in response to the difference in pressure.

11. A method according to claim 10, wherein determining a difference in pressure between an inside of the pressurized compartment and an outside of the pressurized compartment includes measuring at least one of a pressure inside the pressurized compartment or a pressure outside the pressurized compartment.

12. A method according to claim 10, further comprising, subsequent to controlling at least one of the first and second exit valves at least partially in response to the difference in pressure and also subsequent to controlling at least one of the first and second exit valves at least partially in response to determining the flow rates of gases in the first and second systems, determining positions of the first and second exit valves, re-determining a difference in pressure between an inside of the pressurized compartment and an outside of the pressurized compartment, and controlling at least one of the first and second exit valves at least partially in response to determining positions of the first and second exit valves and re-determining a difference in pressure between an inside of the pressurized compartment and an outside of the pressurized compartment.

13. A method according to claim 7, wherein controlling the first and second exit valves includes controlling the first and second exit valves to minimize flow through the first exit valve and to affect an ambient interior flow rate in the pressurized compartment sufficient to accommodate breathing requirements for occupants within the pressurized compartment and to entrain gases flowing from the first and second systems.

14. A method according to claim 13, wherein controlling said inflow valve and first and second exit valves includes controlling said inflow valve and first and second exit valves to cause the gases flowing in the first and second systems to exit the pressurized compartment through, respectively, the first and second exit valves, such that the gases flowing in the first and second systems are prevented from re-circulating in the pressurized compartment and flow through the first exit valve is roughly minimized.

15. A computer program product for facilitating the control of an internal environment of a pressurized compartment of a vehicle, the computer program product comprising a computer-readable storage medium having computer-readable program code portions stored therein, the computer-readable program code portions comprising:
 a first executable code portion for determining at least first and second flow rates of gases in at least first and second systems located in spaced apart portions of the pressurized compartment, wherein the flow rates in the first and second systems are variable; and
 a second executable code portion for controlling at least one of first and second exit valves respectively located in the spaced apart portions of the pressurized compartment at least partially in response to determining the flow rates of gases in the first and second systems such that a quantity of gas exiting the pressurized compartment through the first and second exit valves has a direct relationship to the flow rates of the first and second systems, respectively.

16. A computer program product according to claim 15, wherein said second executable code portion includes an executable code portion for controlling the first valve in response to determining the flow rates of gases in the first and second systems, and further comprising controlling the second valve to modulate pressure in the pressurized compartment.

17. A computer program product according to claim 15, further comprising a third executable code portion for controlling said first and second exit valves to maintain a pressure inside the pressurized compartment that is one of greater than or equal to a predetermined pressure and to avoid movement of gases from said first and second systems to, respectively, said second and first exit valves.

18. A computer program product according to claim 15, further comprising a third executable code portion for determining a difference in pressure between an inside of the pressurized compartment and an outside of the pressurized compartment and a fourth executable code portion for controlling at least one of the first and second exit valves at least partially in response to the difference in pressure.

19. A computer program product according to claim 15, wherein said second executable code portion includes an executable code portion for controlling the first and second exit valves to minimize flow through the first exit valve and to affect an ambient interior flow rate in the pressurized compartment sufficient to accommodate breathing requirements for occupants within the pressurized compartment and to entrain gases flowing from the first and second systems.

20. A computer program product according to claim 19, wherein said second executable code portion includes an executable code portion for controlling said inflow valve and first and second exit valves to cause the gases flowing in the first and second systems to exit the pressurized compartment through, respectively, the first and second exit valves, such that the gases flowing in the first and second systems are prevented from re-circulating in the pressurized compartment and flow through the first exit valve is roughly minimized.

21. An environmental control system according to claim 1 wherein the controller is configured to control the first and second exit valves such that the quantity of gas exiting the pressurized compartment through the first and second exit valves is proportional to the flow rates of the first and second systems.

22. A method according to claim 7 wherein controlling the first and second exit valves comprises controlling the first and second exit valves such that the quantity of gas exiting the pressurized compartment through the first and second exit valves is proportional to the flow rates of the first and second systems.

23. A computer program product according to claim 15 wherein the second executable code portion is configured to control the first and second exit valves such that the quantity of gas exiting the pressurized compartment through the first and second exit valves is proportional to the flow rates of the first and second systems.

* * * * *